US005999088A

United States Patent [19]

Sibbitt

[11] Patent Number: 5,999,088

[45] Date of Patent: Dec. 7, 1999

[54] INFORMATION DISPLAY PAGER

[76] Inventor: Kevin L. Sibbitt, 1012 Chockecherry Dr., Winter Springs, Fla. 32708

[21] Appl. No.: 09/112,243

[22] Filed: Jul. 8, 1998

Related U.S. Application Data

[63] Continuation-in-part of application No. 29/076,679, Sep. 12, 1997, Pat. No. Des. 396,466.

[51] Int. Cl.[6] .................... H04Q 1/40

[52] U.S. Cl. .................... 340/311.1; 340/825.44; 340/825.47; 340/825.48; 34/22; 455/70; 455/231

[58] Field of Search .................... 340/311.1, 825.44, 340/825.47, 825.48, 309.4; 455/54.1, 38.4, 67.7, 231, 70; 34/22, 20, 23; 345/146

[56] References Cited

U.S. PATENT DOCUMENTS

| | | | |
|---|---|---|---|
| 5,086,394 | 2/1992 | Shapira | 364/419 |
| 5,153,582 | 10/1992 | Davis | 340/825.44 |
| 5,182,553 | 1/1993 | Kung | 340/825.44 |
| 5,192,947 | 3/1993 | Neustein | 340/825.44 |
| 5,258,739 | 11/1993 | DeLuca et al. | 340/825.44 |
| 5,396,264 | 3/1995 | Falcone et al. | 345/146 |
| 5,539,395 | 7/1996 | Buss et al. | 340/827 |
| 5,630,207 | 5/1997 | Gitlin et al. | 455/54.1 |
| 5,757,279 | 5/1998 | Fujiwara | 340/825.44 |
| 5,816,918 | 10/1998 | Kelly et al. | 463/16 |

*Primary Examiner*—Edward Lefkowitz
*Assistant Examiner*—Davetta Woods
*Attorney, Agent, or Firm*—James H. Beusse; Holland & Knight LLP

[57] ABSTRACT

A method and apparatus of providing active entertainment for persons waiting for service in which such persons are provided with an electronic pager assembly for notifying when service is available includes an electronically controllable pager assembly having a controllable screen display which is programmed with information likely to be desirable to a person holding the pager. A set of instructions enabling a person to access the information programmed in the pager assembly is printed on the assembly. The pager notification capability functions regardless of whether the information display is or is not active.

19 Claims, 1 Drawing Sheet

INFORMATION DISPLAY PAGER

SPECIFIC DATA RELATED TO APPLICANT

This is a continuation-in-part of patent application Ser. No. 29/076,679, filed Sep. 12, 1997 U.S. Pat. No. D396,466.

BACKGROUND OF THE INVENTION

The present invention relates to a pager, and more specifically, to a method and apparatus for providing text information through a display pager.

Presently, many popular restaurants, where patrons must wait for seating, use a paging system to notify patrons when a table is available. The pager system provides the patronized facility with the ability to recall patrons in an orderly, automated fashion. Though not limited to the restaurant industry, paging systems can be utilized by any business requiring its patrons to wait for extended periods for services. The pagers used in these pager systems are conventionally vibrating pagers which function solely to alert the pager holder that a table is available.

SUMMARY OF THE INVENTION

U.S. patent application Ser. No. 29/076,679, assigned to the assignee of the present invention, discloses an ornamental design for a pager assembly which incorporates a programmable pager into a pager holder. The pager assembly includes two display areas, one display area for an active pager screen display and another display area for presenting static information. The present application is directed to the utilitarian advantages and features of a pager assembly incorporating an active display and a static display. In a preferred form, the static display provides instructions about how to access available pager functions for controlling the active display. Examples of the type of information which can be displayed on the active pager screen display are restaurant menu items, advertisements, news headlines, sports, weather, movie schedules and entertainment news. This information can be displayed in a static (user selected) or revolving manner. The present invention thus provides for displaying useful and entertaining information through the pager while not interrupting the notification functions required of a restaurant type pager system.

BRIEF DESCRIPTION OF THE DRAWINGS

For a better understanding of the present invention, reference is made to the following detailed description taken in conjunction with the accompanying drawings in which.

DETAILED DESCRIPTION OF THE INVENTION

Figure 1:
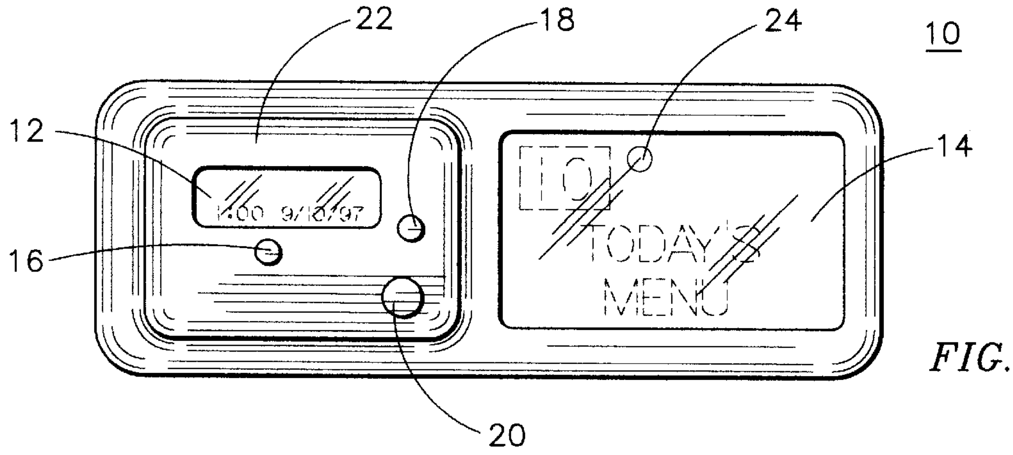
FIG. 1 illustrates a front or top plan view of a pager assembly incorporating teachings of the present invention.
Figure 2:
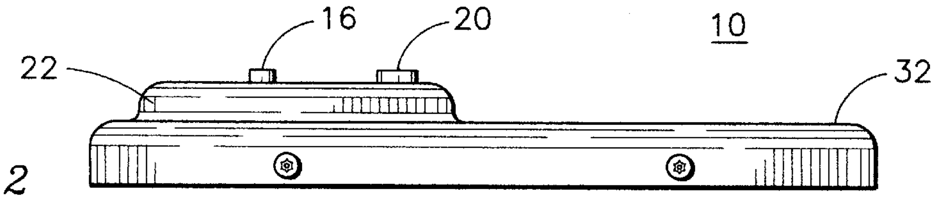
FIG. 2 illustrates an edge or elevation view of the pager assembly of FIG. 1.

Referring to the figures generally and in particular to FIGS. 1 and 2, there is shown a top and an edge view respectively of one embodiment of a pager assembly 10 incorporating teachings of the present invention. The left display area 12 is an active screen display, i.e., a display which is electronically controllable and is generally implemented as an LCD. The right display area 14 is the area where static information is provided and may comprise an area for printed material overlaid by a transparent protective cover. Static information typically includes brief advertisements and textual information or instructions on how to access information programmed in or transmitted to the pager system and available for viewing on the active screen or display area 12. The type of information that can be viewed on screen 12 includes but is not limited to restaurant menu items, advertisements, news headlines, sports, weather, movie schedules and entertainment news. Information is retrieved using three buttons 1 6, 18, 20 which are located on the pager system adjacent the display area 12. Though designated as circular in shape, these buttons may be distinguished either by different colors, sizes, shapes, or symbols etched on the buttons. In the preferred embodiment, the buttons are color differentiated, i.e., button 16 is green, button 18 is blue and button 20 is red. It will be recognized that the size and position of the buttons 16, 18 and 20 are dictated by the commercial pager (not shown) incorporated in the system 10 and concealed within the overlaying housing area 22 surrounding display area 12. For example, a suitable pager is the Motorola Advisor Gold model and the buttons 16, 18, 20 are arranged and designed to overlay and provide for actuation of corresponding buttons on an Advisor Gold pager. The Advisor Gold pager is advantageous since it has sufficient internal memory to store a substantial amount of data. Applicant has found that the internal memory can be programmed to display various data such as restaurant specials or local ads for other businesses. The instructions in area 14 instruct a person about how to access the data stored in memory using the buttons 16, 18, 20. It should be noted that the Advisor Gold series pager has a plurality of individually addressable memory locations, typically 9 to 12, and each location has capacity for storage of up to about 400 characters. Each location can be remotely addressed and loaded with data thus allowing each location to be readily updated as desired.

Figure 3:
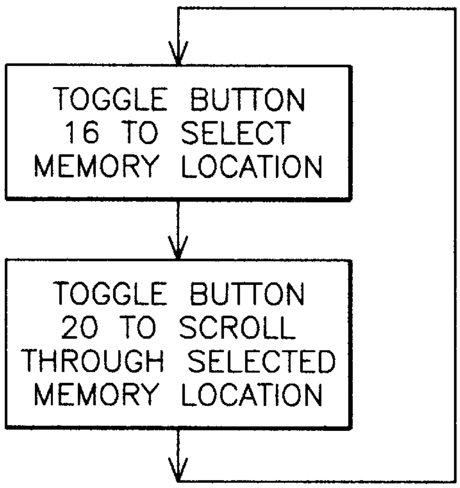
FIG. 3 illustrates a functional flow chart for data selection in the pager assembly of FIG. 1.

FIG. 3 is a simplified functional flow diagram showing selection of the text information features of the pager. For illustration purposes, button 18 activates the informational display 12 of the pager. Once the pager assembly is activated, the button 16 is used to toggle through the available memory locations. The user does not select data by memory location but by subject matter which is displayed on screen area 12 with each press of button 16. The pager is programmed to sequentially step through each “topic” or memory location and then to return to the first topic. Once a topic is selected, the user can repeatedly press button 20 to scroll through all information stored under that topic (or in the selected memory location). For example, one topic may be “MENU” and the button 20 allows the user to scroll through the stored menu selections. Since the memory at each location may be limited to about 400 characters, the MENU selections may be broken into sub-topics at different locations, e.g., entrees, salads and desserts may be separated. Similarly, other information, such as movie listings and schedules, may be spread over multiple memory locations.

While the information display panel is in use, the pager notification functions are still operative. Once the facility activates the notification feature of the pager through the pager’s identification number, a user is made aware that the service they are waiting for is available. Though not the only means of notifying the user, the pager can vibrate for a preselected time, for example, for approximately twelve seconds. The pager assembly may also include an indicator light 24, as viewed in FIG. 1, which can be actuated to indicate receipt of a paging signal. As is well known, the pager generally responds to a paging signal by vibrating. Applicant incorporates an electrical connection from the pager vibration circuit to an external LED at 24 to provide a visual signal.

Figure 4:
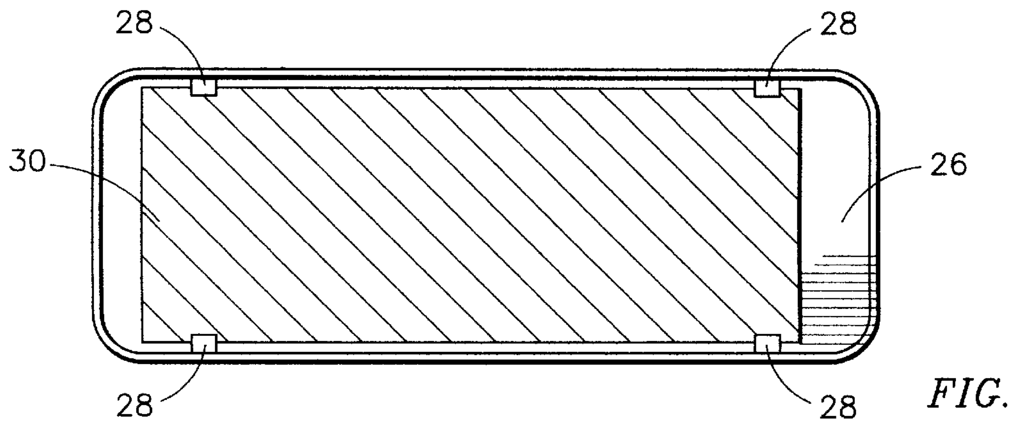
FIG. 4 illustrates a back or bottom plan view of the pager assembly of FIG. 1.

FIG. 4 represents the back side 26 of the pager assembly 10. This area can be affixed with attachment fixtures 28 which will be used to retain replaceable advertisements 30. Thus, as an option to using the pager's memory space for storing a menu, the facility could place a menu on the back of the pager.

The back 26 is preferably attached to the pager housing 32 by screws 34 distributed about the periphery as seen in FIG. 1. The housing 32 is desirably a molded housing such that the back 26 is recessed into housing 32. It will be noted that the housing 32 does not provide for connection of the enclosed pager to a battery charger. In the illustrated embodiment, the enclosed pager uses non-rechargeable batteries which must be periodically replaced which necessitates the separability of the housing 32 and back 26.

While the invention has been described in what is presently considered to be a preferred embodiment, many variations and modifications will become apparent to those skilled in the art. Accordingly, the invention should not be limited to the specific illustrative embodiment but be interpreted within the full spirit and scope of the appended claims.

What is claimed is:

1. A method of providing active entertainment for a person waiting for service in which such person is provided with an electronic pager assembly for notifying when service is available, the method comprising the steps of:

providing an electronically controllable pager assembly having a controllable screen display area;

programming the pager with information;

providing instructions printed on a static display area on the pager assembly enabling a person to access the information via the controllable screen display area; and notifying the person with a paging notification feature operable whether the controllable screen display area is or is not active.

2. The method of claim 1 wherein the pager assembly includes a plurality of control switches for accessing information programmed therein, the method including the steps of programming the pager assembly such that information is organized in categories and operating of one of the switches enables changing of categories.

3. The method of claim 2 and including the step of activating the controllable screen display area using a button on the pager assembly to actuate one of the switches.

4. The method of claim 3 and including the step of toggling through the information using a button on the pager assembly operatively associated with the one of the switches.

5. The method of claim 4 and including the step of vibrating the pager for a designated time period regardless of whether or not the controllable screen display area is active, once the pager is sent a notification signal.

6. The method of claim 5 and including the step of concurrently illuminating a lamp on the pager assembly in response to the notification signal.

7. A pager assembly comprising:

a programmable electronic pager having a screen display area and a first plurality of pushbutton switches;

an elongated housing having a pair of abutting display areas;

one of said display areas including an enclosure for receiving said pager, said enclosure encompassing all of said pager except for said screen display area;

a second plurality of pushbutton switches located on said enclosure and aligned to overlay corresponding ones of the first plurality of pushbutton switches for allowing access to pager functions from external of said enclosure; and another of said display areas comprising printed information.

8. The pager assembly of claim 7 and including a lamp mounted in said housing for providing a visual indication when said pager receives a paging signal.

9. The method of claim 1, further comprising the step of providing information related to a service via the controllable screen display area.

10. The method of claim 1, further comprising the step of providing advertising information via the controllable screen display area.

11. The method of claim 1, wherein the controllable screen display area is disposed on a front side of the pager assembly, and further comprising the step of providing information on a back side of the pager assembly.

12. The pager assembly of claim 7, further comprising a fixture attached to said housing for retaining replaceable advertisements.

13. The pager assembly of claim 7, wherein the printed information comprises instructions for enabling a user to access pager functions through the use of the second plurality of pushbutton switches.

14. The pager assembly of claim 7, wherein the printed information comprises advertisment.

15. A method of processing patrons waiting for a service, the method comprising the steps of:

providing a programmable electronic pager having an active display area and a first plurality of switches;

installing the pager into a housing having an opening aligned with the active display area and having a second plurality of switches aligned to overlay corresponding ones of the first plurality of switches so that operation of the second plurality of switches enables the active display area;

programming the pager with information for display on the active display area;

providing printed information on the housing including instructions for operating the second plurality of switches to enable the active display area;

providing the housing and installed pager to a patron waiting for a service;

operating a pager notification feature when the service is available.

16. The method of claim 15, further comprising the step of affixing an advertisement to the housing prior to the step of providing the housing to a patron.

17. The method of claim 15, wherein the step of programming the pager further comprises programming the pager with information related to the service.

18. The method of claim 15, wherein the step of programming the pager further comprises programming the pager with advertising information.

19. The method of claim 15, wherein the step of providing printed information further comprises providing advertising information.

* * * * *